United States Patent
Brownell et al.

(10) Patent No.: US 6,524,072 B1
(45) Date of Patent: Feb. 25, 2003

(54) DISK FOR A BLISK ROTARY STAGE OF A GAS TURBINE ENGINE

(75) Inventors: John B Brownell, Derby (GB); Peter J Gillbanks, Bristol (GB); Richard J Hawkins, Nottingham (GB); Jonathan P Throssell, Derby (GB); James R Wilson, Barnoldswick (GB)

(73) Assignee: Rolls Royce PLC, London (GB)

( * ) Notice: Subject to any disclaimer, the term of this patent is extended or adjusted under 35 U.S.C. 154(b) by 0 days.

(21) Appl. No.: 09/593,544

(22) Filed: Jun. 14, 2000

Related U.S. Application Data

(62) Division of application No. 09/100,940, filed on Jun. 22, 1998, now Pat. No. 6,095,402.

(30) Foreign Application Priority Data

Jun. 25, 1997 (GB) .............................................. 9713395

(51) Int. Cl.⁷ .............................................. F04D 29/34
(52) U.S. Cl. ............................. 416/213 R; 228/112.1; 29/889
(58) Field of Search .................. 416/213 R; 228/112.1, 228/119; 29/889, 889.1, 889.2

(56) References Cited

U.S. PATENT DOCUMENTS

| | | | | |
|---|---|---|---|---|
| 2,347,034 A | * | 4/1944 | Doran | 416/213 |
| 3,588,276 A | * | 6/1971 | Jubb | 416/213 |
| 4,335,997 A | * | 6/1982 | Eing et al. | 416/213 |
| 4,784,572 A | * | 11/1988 | Novotny et al. | 416/213 |
| 4,784,573 A | * | 11/1988 | Ress, Jr. | 416/213 |
| 4,873,751 A | | 10/1989 | Walker et al. | |
| 4,883,216 A | | 11/1989 | Patsfall | |
| 4,934,583 A | | 6/1990 | Patsfall | |
| 5,197,857 A | | 3/1993 | Glynn et al. | |
| 5,511,949 A | * | 4/1996 | Thore | 416/213 |
| 5,518,562 A | | 5/1996 | Searle et al. | |
| 5,678,749 A | | 10/1997 | Pratt et al. | |
| 5,797,182 A | | 8/1998 | Furlan et al. | |
| 5,813,593 A | | 9/1998 | Galaske, Jr. | |
| 5,865,364 A | | 2/1999 | Trask et al. | |
| 5,876,183 A | | 3/1999 | Furlan et al. | |
| 6,095,402 A | * | 8/2000 | Brownell et al. | 228/112.1 |

FOREIGN PATENT DOCUMENTS

| | | |
|---|---|---|
| EP | 0 376 874 A2 | 7/1990 |
| EP | 0 513 669 A2 | 11/1992 |
| EP | 0 719 614 A1 | 7/1996 |
| GB | 2 218 016 A | 11/1989 |
| GB | 2 230 991 A | 11/1990 |

* cited by examiner

*Primary Examiner*—John Kwon
(74) *Attorney, Agent, or Firm*—Oliff & Berridge, PLC

(57) ABSTRACT

A disk for a BLISK rotary stage of a gas turbine engine includes a stub on the tapered circumferential surface of a turbine disk, the stub defining a weld joint surface on the radially outermost face of the stub. The weld joint surface follows the annulus curvature in axial and circumferential directions while remaining flat in a third direction. A blade is applied radially to the stub and linear friction welding of the blade to the stub is effected by oscillating the blade in said third direction while applying a welding force inwardly along the blade.

9 Claims, 3 Drawing Sheets

DISK FOR A BLISK ROTARY STAGE OF A GAS TURBINE ENGINE

This is a Division of Application No. 09/100,940 filed Jun. 22, 1998 now U.S. Pat. No. 6,095,402. The entire disclosure of the prior application(s) is hereby incorporated by reference herein in its entirety.

BACKGROUND OF THE INVENTION

1. Field of the Invention

This invention concerns improvements in or relating to the friction welding of components.

In particular, the invention concerns a method for the manufacture or repair of a BLISK by linear friction welding.

2. Description of the Related Art

The two most commonly used methods for manufacturing BLISKs are machining from solid and attaching separately made blades onto a disk by friction welding. A further operation to remove upset or welding flash may be required as part of a finish machining procedure. Machining from solid is expensive and inevitably results in an unacceptable wastage of material, especially in the case of larger BLISKs. The method of present interest, in any case, can be employed as a repair technique to replace individual blades irrespective of whether a BLISK was manufactured from solid or fabricated using the same method. However, friction welding of blades onto a disk permits the blade and disk properties to be optimised, such as in a cast blade and a forged disk, and the use of dissimilar materials.

Methods for fabrication or repair of integrally bladed rotor assemblies involving providing a projecting stubs on the disk periphery are described in EP 376,874 (equivalent U.S. Pat. No. 4,873,751, and GB 2,218,016 (equivalent U.S. Pat. No. 4,883,216). Although the shape or configuration of the projecting stub is mentioned in both documents the top surface of the stub, which forms a joint surface, is not considered. The drawings contained in these patent specifications invariably show a planar top surface on the stub. However, EP 376,874 (and equivalents) does not mention linear friction welding as a possible joining technique, and GB 2,218,016 mentions it only as one of a possible list of techniques for heating the joint without any ensuing discussions whatsoever. In all instances, however, a weld force is shown acting "downwards" urging the new blade onto the stub in a generally radial direction. In order to avoid lateral displacement of one part relative to another in the joint or other distortion effects there is good reason to generate the weld joint surface in a flat plane perpendicular to a radial direction containing the applied weld force.

Gas turbine engine rotors are not normally designed with a cylindrical gas washed surface, thus a disk peripheral surface is almost always convergent, in one axial direction or the other, with the disk rotational axis. Furthermore, this surface may also be concave or convex and in some fan and low pressure compressor stages utilizing wide chord blades having a significant circumferential length the footprint of the blade on the disk surface is three dimensional and complex.

In friction welding the disk is clamped and, for example, a location on the disk periphery is presented to a welding station. At the welding station a blade clamped in a second item of tooling is rubbed against the disk surface to generate frictional heat at the interface. When a predetermined loss of length is achieved the blade is brought suddenly to a halt at a precisely defined location on the disk and is pressed against the disk for a short time to create the weld. When the assembly has cooled flash at the interface is removed and any required finish machining operations are carried out. If an airfoil has been damaged, e.g. by foreign object ingestion into an engine core, it is possible to remove a damaged blade and then to insert a replacement blade by the friction welding technique, thus avoiding the necessity of replacing a damaged BLISK in its entirety.

SUMMARY OF THE INVENTION

It is an object of the present invention to provide a way of using existing linear friction welding machines for original manufacture and repair, for example, of the aforesaid BLISKs having high hade angles and annulus curvature, while satisfying the required design and manufacture criteria. The "hade" angle is the angle between the axis of a disk and tangent to a tapering disk peripheral surface.

According to one aspect of the present invention there is provided a method for the manufacture or repair of a BLISK in which a blade is attached by linear friction welding to a disk having a generally conical peripheral surface, comprising forming on the disk and the blade weld joint surfaces which during welding are urged into contact by a weld force, causing linear oscillation of the blade relative to the disk in a predetermined direction while simultaneously applying said weld force, characterised in that the disk weld joint surface is formed on the upper surface of an upstanding stub on the circumferential periphery of the disk at a substantially constant height above the disk periphery surface, the shape of the stub weld joint surface in axial and circumferential directions being determined according to the intersection of a blade envelope with the tapering periphery of the disk, and in a third direction by the locus of a straight line parallel to the predetermined direction of welding oscillation, and forming on the blade a weld joint surface complementary to the surface on the stub.

According to another aspect of the present invention there is provided a disk for a BLISK rotary stage of a gas turbine engine having formed on the circumference thereof at least one stub to which an airfoil blade may be welded in a friction welding operation wherein in axial and circumferential directions the edges of the platform conform to a shape defined by an intersection of a blade to be welded with the periphery of the disk and the upper surface of the stub is formed as a surface containing the locus of a line in a chosen direction of welding oscillation parallel to a surface tangential to the disk periphery.

According to a further aspect of the present invention there is provided a disk for a BLISK rotary stage of a gas turbine engine having formed on the circumference thereof a plurality of stubs spaced apart in a circumferential direction to each of which an airfoil blade may be welded in a friction welding operation wherein in axial and circumferential directions the stubs conform to an intersection of a blade to be welded with the periphery of the disk and the upper surfaces of the stubs are formed as a surface containing the locus of a line in a chosen direction of welding oscillation parallel to a chord of the blade.

BRIEF DESCRIPTION OF THE DRAWINGS

The invention will now be described by way of example only with reference to the accompanying diagrammatic drawings (not-to-scale) in which.

DESCRIPTION OF PREFERRED EMBODIMENTS

Figure 1:
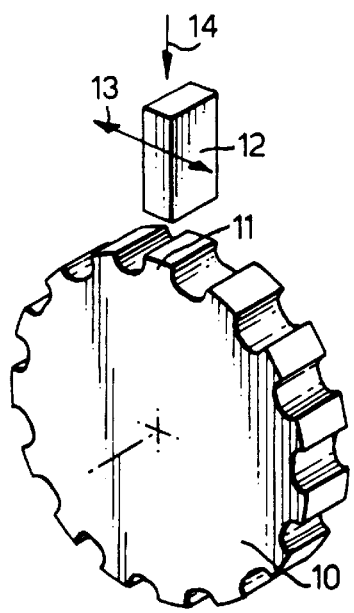
FIG. 1 illustrates the principle of a known linear friction welding method using a planar weld joint and tangential motion.

The present invention employs a form of friction welding using linear motion in which the blade is reciprocated in a rectilinear movement in a plane which in the prior art is usually tangential to the disk and applying a forging force in a radial direction. This known process is illustrated in the accompanying FIG. 1 which is a diagrammatic view of a disk 10 and a single blade blank 12. The disk 10 is provided with a plurality of upstanding stubs 11 on its periphery, that is its circumferential surface. Typically, a blade 12 is urged in contact with the stub 11 by a force 14 and oscillated to and fro in the directions of arrows 13 over a range of linear movement in a range from ±1 mm to ±13 mm. This range of movement is a typical example only and the given dimensions are not intended to be limiting. Simultaneously a suitable forge force 14 is applied in a generally radially inward direction. see arrow 14 in the drawing. The magnitude of the forge force 14 depends on the area of the joint and the materials being joined, a force in the region of 150 Megapascals is typical, although again it is not limiting as will be appreciated by those skilled in the art of friction welding.

Figure 2:
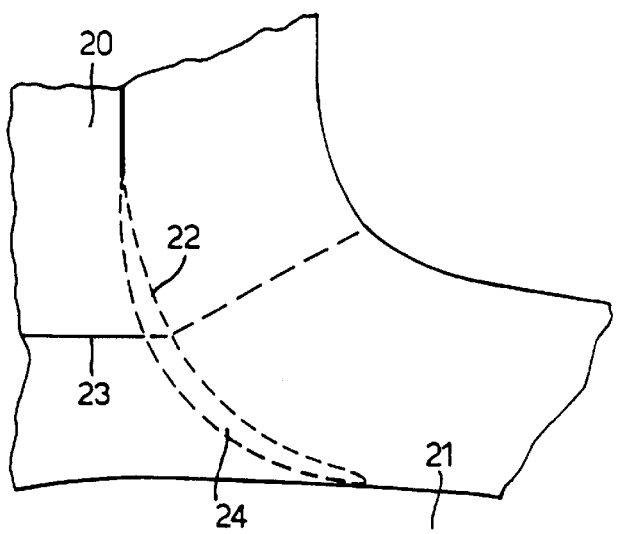
FIG. 2 illustrates the preferred positioning of the weld plane relative to the fillet radius.

Hitherto, for the reasons previously discussed, it has been normal to use a planar weld joint interface which is flat in two dimensions, for example in both axial and tangential directions, subject to the requirement that the weld plane lies within the fillet radius between the blade and the disk rim. This is shown in the accompanying FIG. 2 which is a detail view of a joint of a blade 20 welded to a disk rim 21. The profile of the original fillet (i.e. the concave junction where the outer surfaces of the blade and disk meet) is shown by dashed line 22. The weld joint plane is shown by line 23, and lies within the fillet, where stresses are lower, the weld area is larger, and where it is possible to clean up the edge of the weld and improve the aerodynamic profile by machining a reduced size of fillet, as shown by dashed line 24, so that the radius of the cleaned-up profile 24 is less than that of profile 22. Generally, the smaller the fillet radius the better the scope for aerodynamic enhancement of the structure and lower weight. The position of the weld joint plane 23 is further restricted by the need to keep the heat affected zone, generated during the welding process, out of the disk rim and so avoid any detrimental effects on the properties of the disk material and its life. For this reason the blades are welded to the stubs 11 on the periphery of the disk rather than directly to the disk circumference.

Figure 3:
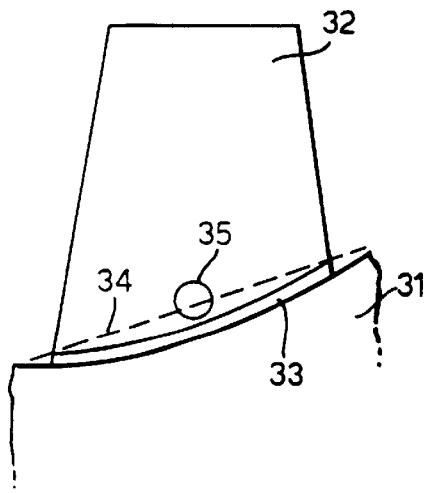
FIGS. 3 and 4 show divergences between the fillet radius region and the weld plane of conventional friction welds for large blades.
Figure 4:
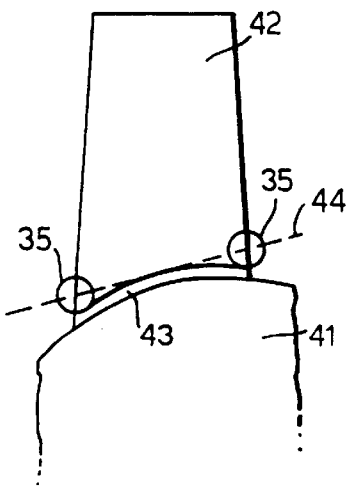

With more complex geometric forms of the disk and blade, especially large fan blades on tapered disks, it becomes more difficult to satisfy design and manufacturing constraints associated with the weld position when using linear motion. As a result, using known conventional criteria, with blades having a long chordal length and high stagger, it may not be possible to define a two-dimensional weld plane which is wholly satisfactory because the spacing between the disk periphery and a two-dimensional plane surface along the chord of the blade is too great in some regions. For instance, in the case of the BLISKs shown in FIGS. 3 and 4, in which the disks are indicated by 31, 41, the blades by 32, 42, fillet regions by 33, 43, and linear weld planes by dashed lines 34, 44 respectively, some regions of the welds, indicated by circles 35, would lie outside the fillet regions. Such structures would be mechanically undesirable for a gas turbine engine operation.

This is even more so when considering the manufacture of BLISKs having high hade angles and annulus curvature, coupled with large blade stagger and twist. Conventional linear friction welding by means of planar weld surfaces is not considered a practical solution since by applying the known rules the fillet radius required to keep the weld within the radiused region is too large for acceptable aerodynamic performance. Angular friction welding is a possible solution since it allows the weld interface to be on a surface of a solid of revolution centred on the axis of angular reciprocation. However, angular reciprocation of a disk requires much the same space as tangential motion of a blade and may not be desirable. It may not be appropriate for all blade/disk layouts and cannot be performed using existing apparatus.

Figure 5:
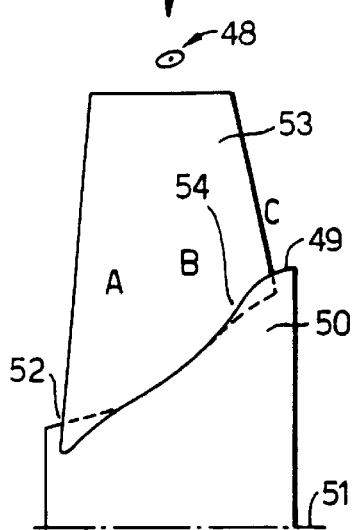
FIG. 5 is a longitudinal section through a portion of a BLISK made according to the invention.

Referring to FIG. 5 there is shown part of a gas turbine fan or compressor disk 50 which has a tapered periphery 49, that is the diameter of the disk 50 about its axis 51 increases in the downstream direction and in the example illustrated it increases in a non-linear manner. In accordance with the invention a stub 52 is formed on the periphery 49 of the disk 50 to receive a blade 53 by linear friction welding. Because of the high stagger angle of the blade 53 the intersection of the blade with the disk periphery has a complex profile since it involves a portion of circumferential curvature as well as the axial profile of the disk. Relative to an axially extending "horizon" on the disk surface passing through a mid-chord region of the blade the leading and trailing edges of the blade are "below" and over" the horizon respectively, In this instance the chosen direction of welding oscillation 48 is tangential to the disk periphery 49. The view of FIG. 5 is on a radial section and is therefore perpendicular to the direction of oscillation. The profile of stub 52 is thus seen in silhouette, in which view it is clearly seen that the stub outline, and in particular its upper surface which constitutes the weld joint surface 54 follows the tapered profile of the disk periphery 49 in the axial direction and the curvature of the circumference. The height of stub 52 above the disk rim is defined by minimum requirements for avoidance of both weld heat affected zone at the rim and fouling of the blade on the disk as it is oscillated. The inclination of the surface to the stacking axis of the blade is used to optimise further the conformance to the disk profile.

Figure 6:
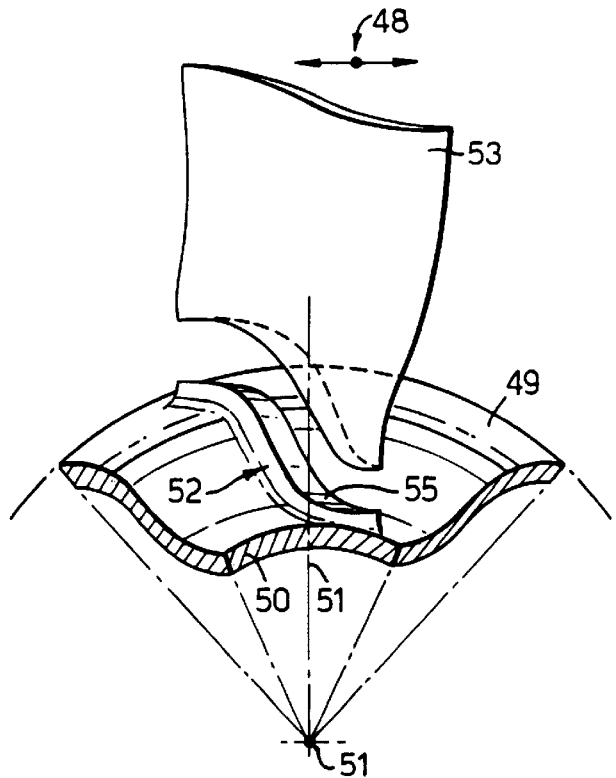
FIG. 6 is an axial view of the BLISK portion of FIG. 5.
Figure 7:
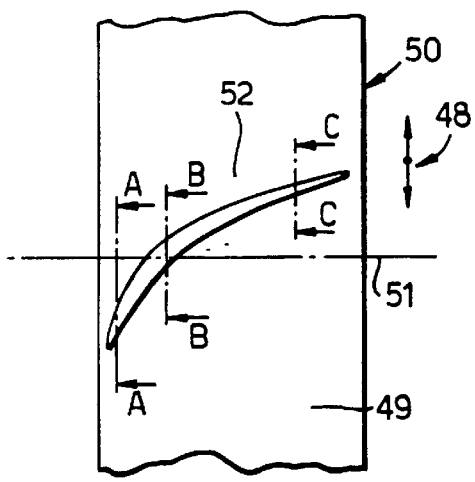
FIG. 7 is a plan view in the direction of arrow VII of the disk portion only of FIG. 5 showing a disk stub.
Figure 8:
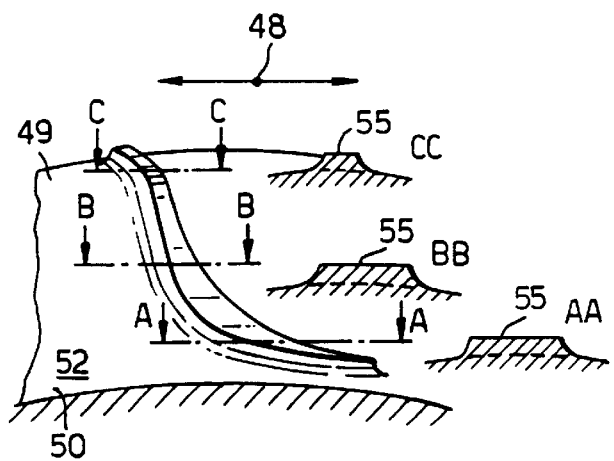
FIG. 8 shows sections through the disk stub of FIGS. 5–7 taken in the directions of arrows A, B and C to illustrate the direction of the linear friction welding oscillation.

FIG. 6 illustrates the same blade installation viewed in an axial direction, from which it is evident that the stub 52 also follows the curved annulus of the disk surface in the circumferential direction as well as in the axial direction. FIG. 7 again shows the same arrangement this view in a radial direction. Thus FIGS. 5, 6 and 7 represent mutually orthogonal views of a single blade installation, in particular of a disk stub to which the blade is welded. FIG. 8 illustrates an axial view of the stub 52 alone together with three cross sections at cuts A, B and C the positions of which are also indicated in FIG. 7. The blade stub 52 has a low profile (for the reason given above) and follows the axial periphery of the disk 50. It will be readily apparent that a centre line of the stub has a marked radial curvature in the circumferential direction in combination with significant change in radial distance from axis 51 in accordance with the axial profile of the disk.

Taken together these four views illustrate the feature that the upper surface 55 although it is not a plane surface is flat in the direction of welding oscillation. That is, the surface 55 is generated by the locus of a straight line parallel to the predetermined direction of welding oscillation, in this case a tangential direction, which is swept over disk periphery at the desired radial height of the stub 52. Clearly at any section cut, for example at A, B or C in FIG. 8, the upper surface 55 of the stub is flat and parallel to a tangent at some point on the disk periphery 49 and parallel to the direction of welding oscillation. However, said point on the disk periphery 49 containing the tangent is not necessarily within the limits of the stub 52, although that is possible.

It will be apparent that there is a point on the disk periphery 49 (on a line parallel to the disk axis 51) which will yield a stub upper surface 55 perpendicular to a radial line. This is the configuration indicated by the term tangential motion. The direction of oscillation 48 is then perpendicular, or parallel to such a perpendicular, to the disk axis 51. However, a number of other possibilities exist to satisfy the same criteria.

The direction of welding oscillation may be tilted relative to a disk radius so that a line perpendicular to the direction of oscillation 48 no longer intersects the disk axis 51. In this case the whole of the upper surface 55 of the stub is inclined with respect to previously defined tangent, together with the straight lines parallel to the direction of oscillation. In this case the direction of the weld force also is no longer radial. As a result an additional torque couple tending to oscillate the disk angularly relative to a blade must be reacted in order to avoid positional errors arising.

Figure 9:
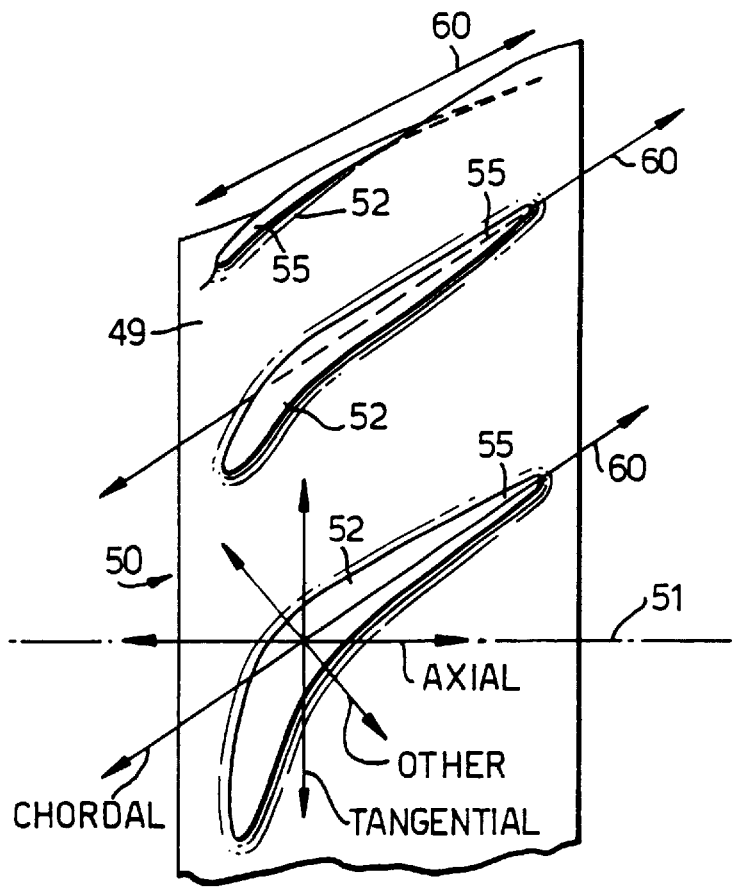
FIG. 9 is by way of reference only and is a longitudinal section through part of a disk illustrating the hade angle.
Figure 10:
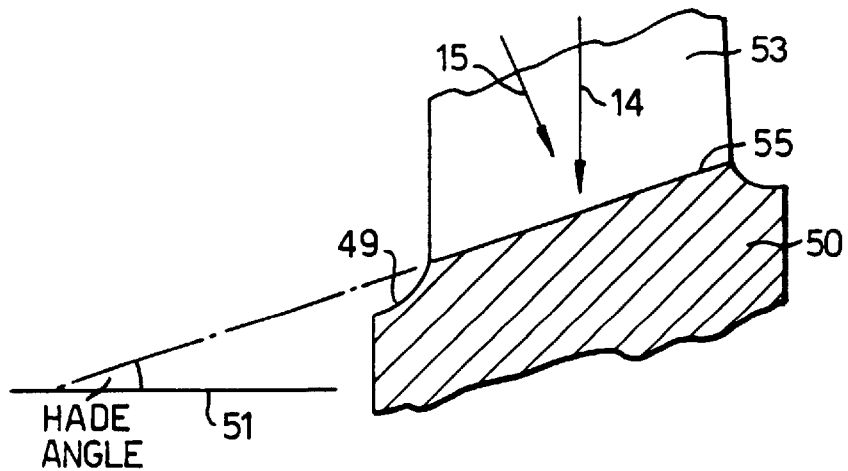
FIG. 10 illustrates the directions of applied forces and hade angle.

In a further re-orientation of the welding forces the direction of welding oscillation may be given a significant axial component as shown at 60 in FIGS. 9 and 10. FIG. 10 shows an axial section through a disk 50 and stub 52 with a markedly increasing diameter. The hade angle is the angle shown between a tangent to the disk periphery in the axial direction and the disk axis 51.

Thus in accordance with the invention the weld joint surface follows the annulus curvature in axial and circumferential directions, while remaining flat in the direction of linear friction welding oscillation. Thus it is not planar in the same manner as existing linear friction weld planes, nor is it on a surface of a solid of revolution as in angular friction welding. Further, it is superior to a simple curve defined along the annulus at the blade stacking axis position which does not account for circumferential (horizon) effects and therefore requires fillet radii that are unacceptably large.

This three-dimensional arrangement of direction components may be selected to produce welding oscillation in the same direction as the chord of the blade being welded. In this case the upper surface 55 of the weld stub 52 may be inclined to axial and tangential directions but continues to be defined by the locus of a line parallel to direction of welding oscillation at a predetermined height above the disk periphery 49.

In all instances across the range of possibilities a complementary weld joint surface is formed on a blade 53 which exactly follows the contour of the upper surface 55 of the weld stub 52. Consequently when the blade 53 is offered up to a weld stub 52 at the commencement of a welding operation the whole of both surfaces are in mutual contact and are able to move against each other in reciprocal motion in the weld oscillation direction (48 or 60) while maintaining rubbing contact.

In FIG. 9 there is superimposed on the stub 52 which is viewed in a radial direction, a "rose" illustrating the possible directions of oscillation during a welding operation. The "axial" direction is aligned parallel to the disc axis 51; perpendicular to "axial" is the "tangential" direction, as previously discussed above. In addition there is shown a "chordal" direction and an "other" direction. These two latter directions are not of fixed orientation and may subtend any convenient angle relative to the fixed directions in the range 0°–180°.

The forces applied to a blade during a welding operation need not be radial. For example in the friction heating phase the motion need not be in or parallel to a tangential plane, providing the reaction forces can be contained and do not result in movements giving rise to positional errors. FIG. 10 indicates the applied force 14, which generates the friction, and the forge force 15, which generates the welding upset similarly are not fixed, or event co-incident. These forces do not need to be normal to the weld surface, although in known use of prior art apparatus the forces are usually arranged in such manner with the exception of apparatus according to our earlier published patents EP 0.719.614 (U.S. Pat. No. 5,678,749).

A major advantage of the weld surface of the invention is that it allows close conformance of the weld interface to the annulus profile, thus meeting design and manufacture criteria to keep the weld within the fillet radius. The resulting minimum fillet radius size for a given BLISK geometry which requires linear friction welding provides minimum aerodynamic loss and provides the minimum weight solution.

The invention enables existing linear friction welding machines and techniques to be used to produce BLISKs for complex blade and disk geometries which cannot otherwise be easily or economically addressed. It also enables BLISKs to be manufactured and repaired with minimum material addition for process capability, hence minimum compromise from design ideal. The invention may be realised in BLISKs of any sort (compressor or turbine) which use friction welding to join the blades to the disk.

What is claimed is:

1. A disk for a BLISK rotary stage of a gas turbine engine, comprising:
 a tapered periphery; and
 at least one stub formed on the tapered periphery to which at least one blade may be welded by linear friction welding, wherein in axial and circumferential directions of the disk, edges of the at least one stub conform to a shape defined by an intersection of the at least one blade with the tapered periphery, and an upper surface of the at least one stub is formed parallel to a surface tangential to the disk in a region of the intersection, wherein the upper surface is defined by the locus of a line parallel to a direction of welding oscillation at a predetermined height above the tapered periphery.

2. The disk according to claim 1, wherein the diameter of the disk increases in a downstream direction of the gas turbine engine.

3. The disk according to claim 2, wherein the diameter of the disk increases non-linearly.

4. The disk according to claim 1, wherein the upper surface is parallel to a tangent at a point on the tapered periphery and parallel to a direction of welding oscillation.

5. A BLISK rotary stage of a gas turbine engine, comprising:
- a disk having a tapered periphery;
- at least one stub formed on the tapered periphery; and
- at least one blade attached to the at least one stub by linear friction welding, wherein in axial and circumferential directions of the disk, edges of the at least one stub conform to a shape defined by an intersection of the at least one blade with the tapered periphery and an upper surface of the at least one stub is formed parallel to a surface tangential to the disk in a region of the intersection.

6. The BLISK according to claim 5, wherein the diameter of the disk increases in a downstream direction of the gas turbine engine.

7. The BLISK according to claim 6, wherein the diameter of the disk increases non-linearly.

8. The disk according to claim 5, wherein the upper surface is defined by the locus of a line parallel to a direction of welding oscillation at a predetermined height above the tapered periphery.

9. The disk according to claim 5, wherein the upper surface is parallel to a tangent at a point on the tapered periphery and parallel to a direction of welding oscillation.

* * * * *